United States Patent Office 3,413,338
Patented Nov. 26, 1968

3,413,338
2-NITROCYCLOPENT-1-ENECARBOXYLIC ACID
Brian Frederick Burrows and William Brian Turner,
Macclesfield, England, assignors to Imperial Chemical Industries Limited, London, England, a corporation of Great Britain
No Drawing. Filed Feb. 12, 1965, Ser. No. 432,372
Claims priority, application Great Britain, Apr. 21, 1964, 16,500/64
1 Claim. (Cl. 260—514)

ABSTRACT OF THE DISCLOSURE

The compound 2-nitrocyclopent-1-enecarboxylic acid is disclosed. It is used, by reaction with ammonia, to prepare the plant growth regulant 1-amino-2-nitrocyclopentanecarboxylic acid. The 2-nitrocyclopent-1-enecarboxylic acid may be prepared in various ways, for example, by reacting 1-iodo-2-nitrocyclopentanecarboxylic acid with pyridine at about 18–22° C. for about 4–6 hours.

---

This invention relates to the manufacture of a cyclic compound and more particularly it relates to the manufacture of a cyclopentane derivative which possesses growth-regulating properties when applied to plants.

There has previously been described and claimed a new metabolic product named MM27 of the formula:—

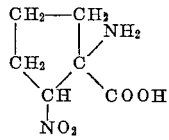

and a method of obtaining it by a fermentation process which comprises cultivation of an active strain of the organism *Aspergillus wentii* in a nutrient medium contaninig an assimilable source of carbon and an assimilable source of nitrogen.

We have now found that the product MM27 can be produced by reaction of certain cyclopentane derivatives with ammonia.

According to the invention we provide a process for the manufacture of MM27 which comprises reaction of a compound of the formula:

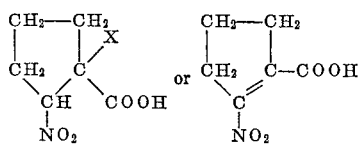

wherein X stands for a substituent capable of replacement by an amino group, with ammonia.

As a suitable substituent (X) capable of replacement there may be mentioned for example a halogen atom, or an hydroxy, a methanesulphonate, a p-toluenesulphonate, an acetate, a nitrite or a nitrate radical.

The process may be carried out by interaction of the compound of the stated formula with aqueous ammonium hydroxide at ambient temperature for example by reaction of the compound with 31% w./v. aqueous ammonium hydroxide at a temperature of about 18–22° C. for about 20–50 hours.

The compound used as starting material may be obtained, for example, according to the following procedure.

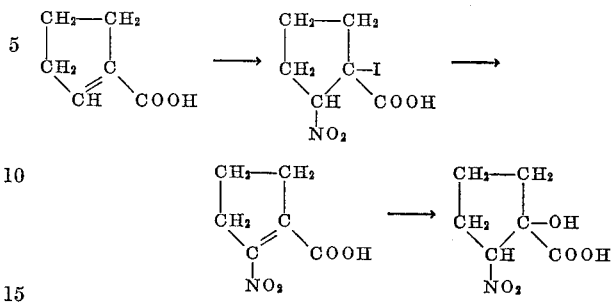

Thus, for example, the compound, 1-iodo-2-nitrocyclopentanecarboxylic acid, may be obtained from cyclopentenecarboxylic acid by reaction with iodine and dinitrogen tetroxide in the presence of diethyl ether at a temperature of about 0–5° C.

The compound, 2-nitrocyclopent-1-enecarboxylic acid, named by us as T.69, may be obtained from 1-iodo-2-nitrocylclopentanecarboxylic acid by reaction with pyridine at a temperature of about 18–22° C. for about 4–6 hours. The said compound T.69 may also be obtained from 1-hydroxy-2-nitrocyclopentanecarboxylic acid by heating with dimethylsulphoxide or it may be obtained from 1-hydroxy-2-nitrocyclopentanecarboxylic acid or from MM27 itself by hydrolysis by means of heating in an aqueous medium, for example in water, in the presence of an inert gas such as nitrogen.

The compound, 1-hydroxy-2-nitrocyclopentanecarboxylic acid, may be obtained from the compound T.69 or from MM27 by hydrolysis by means of heating in an aqueous medium, for example in water, in the presence of an inert gas such as nitrogen.

The compound, named by us as T.69, is a novel compound and thus as a further feature of the present invention we provide the compound, 2-nitrocyclopent-1-enecarboxylic acid and salts and esters thereof.

The compound T.69 is characterised by the following properties. It has a melting point of 102–103° C. and elementary analysis for carbon, hydrogen and nitrogen shows C, 45.8; H, 4.5; N, 8.9%; $C_6H_7NO_4$ requires C. 45.9; H, 4.5; N,8.9%. Its infra-red absorption spectrum determined on a Nujol null shows bands at 2620 (s), 2500 (s), 2350 (sh), 1725 (br. vs.), 1690 (s), 1671 (s), 1617 (br. vs.) and 1515 (br. vs.) and when determined in bromoform shows bands at 1745 (sh), 1715 (s), 1668 (m) and 1565–1515 (br. vs.). Its ultraviolet absorption spectrum in ethanol shows maxima at 220 and 265 m$\mu$, $\epsilon$= 5,100 and 4200 respectively. Its ultraviolet absorption spectrum in ethanolic ammonium hydroxide shows maxima at 235 and 291 m$\mu$, $\epsilon$=4300 and 5,300 respectively.

The said novel compound, T.69 may be prepared according to the processes described above and these processes for the manufacture of T.69 form a further feature of the invention.

The invention is illustrated but not limited by the following examples:

Example 1

A solution of 1-hydroxy-2-nitrocyclopentanecarboxylic acid (50 mg.) in ammonium hydroxide (5 ml. 31% w./w.) is kept at 18–22° C. for 48 hours. The mixture is then evaporated to dryness under reduced pressure and the solid residue is dissolved in water (5 ml.) and the solution is run on to a column of Amberlite IRC–50 resin (5 g., analytical grade). The column is eluted with water (25 ml.) and the eluate is evaporated to dryness under reduced pressure. There is thus obtained 1-amino-2-nitrocyclopentanecarboxylic acid as a crystalline solid identified by infra-red spectroscopy, by thin layer chromatography on silica gel G (solvent: 60/20/20 n-butanol/acetic acid/water; spray; ninhydrin/collidine/$Cu^{++}$) and by paper chromatography on Whatman No. 3 paper (solvent: n-butanol/acetic acid/water (100/22/50); sprays; ninhydrin, ferric chloride).

The 1-hydroxy-2-nitrocyclopentanecarboxylic acid used as starting material may be obtained as follows:

A solution of 2-nitrocyclopent-1-enecarboxylic acid (53 mg.) in boiling water (15 ml.) is heated under reflux in an atmosphere of nitrogen for 2.5 hours. The reaction mixture is then cooled and extracted with ether. The extract is dried over anhydrous sodium sulphate and filtered and it is then evaporated under reduced pressure. There is thus obtained a crystalline solid (51 mg.), identified by its infra-red spectrum as 1-hydroxy-2-nitrocyclopentanecarboxylic acid.

Example 2

A solution of 2-nitrocyclopent-1-enecarboxylic acid (50 mg.) in ammonium hydroxide (5 ml. 31% w./w.) is kept at 18–22° C. for 48 hours. The reaction mixture is then treated according to the procedure as described in Example 1 and there is thus obtained 1-amino-2-nitrocyclopentanecarboxylic acid. The 2-nitrocyclopent-1-enecarboxylic acid used as starting material may be obtained as follows:

A solution of 1-iodo-2-nitrocyclopentanecarboxylic acid (300 mg.) in dry pyridine (30 ml.) is kept at 18–22° C. for 5 hours and is then diluted with water (300 ml.) and acidified with 2 N-hydrochloric acid. The mixture is extracted with ether (4× 100 ml.) and the combined ethereal extracts are washed with water (2× 50 ml.) and dried over anhydrous sodium sulphate. The ethereal solution is then evaporated to dryness under reduced pressure. The residue is dissolved in chloroform (10 ml.) and the solution is subjected to chromatography on silica gel (10 g., Hopkin and Williams M.F.C.). The column is eluted with 30% v./v. chloroform in benzene and the eluate is evaported to dryness in vacuo. The solid residue is crystallised from benzene-light petroleum (60–80° C.) and there is thus obtained 2-nitrocyclopent-1-enecarboxylic acid, M.P. 101.5–103° C. identified by its properties as given earlier in the specification.

Example 3

A solution of 1-iodo-2-nitrocyclopentanecarboxylic acid (250 mg.) in ammonium hydroxide (25 ml., 31% w./w.) is kept at 18–22° C. for 20 hours. The mixture is then evaporated to dryness and the solid residue is dissolved in water (5 ml.) and the solution is run on to a column of Amberlite IRC–50 resin (10 g., analytical grade). The column is eluted with water (75 ml.) and the eluate is evaporated to dryness in vacuo. The residue is washed with acetone to remove ammonium iodide and it is then re-dried in vacuo. The residue is crystallised from water and there is thus obtained 1-amino-2-nitrocyclopentanecarboxylic acid.

The 1-iodo-2-nitrocyclopentanecarboxylic acid used as starting material may be obtained as follows:

A solution of cyclopentenecarboxylic acid (3.36 g.) and iodine (8.4 g.) in diethyl ether (300 ml.) is cooled to 0–5° C. and a solution of dinitrogen tetroxide (2.1 g.) in diethyl ether (50 ml.) is added dropwise with stirring. The reaction mixture is stirred for a further 3.75 hours at 0–5° C. and it is then evaporated to dryness under reduced pressure. The residue is dissolved in chloroform (40 ml.) and the solution is subjected to chromatography on silica gel (400 g. Hopkin and Williams M.F.C.). The column is eluted with chloroform and the eluate is evaporated to dryness in vacuo. The residue is crystallised from benzene-light petroleum (B.P. 60–80° C.) and there is thus obtained 1-iodo-2-nitrocyclopentanecarboxylic acid as a yellow crystalline solid, M.P. 117–118.5° C. (Found: C, 25.4; H, 2.9; N, 4.7; I, 44.3%; $C_6H_8NO_4I$ requires: C, 25.3; H, 2.8; N, 4.9; I, 44.5%)$\nu_{max}$ (Nujol): 1695, 1545 $cm^{-1}$.

What we claim is:
1. 2-nitrocyclopent-1-enecarboxylic acid.

References Cited

Wagner and Zook: Synthetic Organic Chem., J. Wiley, New York, 1953 p. 32.

Morrison and Boyd: Organic Chem., Allyn and Bacon, Boston, 1959, p. 526.

Cram and Hammond, Organic Chemistry, McGraw-Hill, New York (1964), p. 335.

LORRAINE A. WEINBERGER, *Primary Examiner.*

P. J. KILLOS, *Assistant Examiner.*